United States Patent [19]
Laycak et al.

[11] 3,781,117
[45] Dec. 25, 1973

[54] APPARATUS FOR SURFACE INSPECTION OF MOVING MATERIAL

[75] Inventors: John F. Laycak, West Mifflin Borough; Gerald J. Readal, O'Hara Township, Allegheny County; Samuel B. Prellwitz, Wilkinsburg Borough, all of Pa.

[73] Assignee: United States Steel Corporation, Pittsburgh, Pa.

[22] Filed: Mar. 31, 1972

[21] Appl. No.: 240,086

Related U.S. Application Data

[63] Continuation-in-part of Ser. No. 121,092, March 4, 1971, abandoned.

[52] U.S. Cl. ........... 356/200, 356/237, 250/219 DF
[51] Int. Cl. .............................................. G01n 21/32
[58] Field of Search ...................... 356/71, 102, 159, 356/167, 200, 237, 238, 239, 240; 250/219 DF

[56] References Cited
UNITED STATES PATENTS 3,618,063  11/1971  Johnson ...................... 250/219 DF
3,410,643  11/1968  Jorgensen ...................... 250/219 DF

FOREIGN PATENTS OR APPLICATIONS 1,077,561  8/1967  Great Britain ................ 250/219 DF

*Primary Examiner*—David Schonberg
*Assistant Examiner*—Paul K. Godwin
*Attorney*—Rea C. Helm

[57] ABSTRACT

An inspection system for the surface of moving material where defects have a different optical appearance than the remainder of the strip. A plurality of photosensitive diodes positioned across the material detects defects periodically. Diode outputs are counted to identify the perimeter of a defect for each scan line. A computer determines the recognition vectors of the defect and identifies the nature of the defect, extent of the defect and the existence of a pattern of repetition.

4 Claims, 3 Drawing Figures

APPARATUS FOR SURFACE INSPECTION OF MOVING MATERIAL

This application is a continuation-in-part of application Ser. No. 121,092 filed Mar. 4, 1971 (now abandoned), and entitled "Apparatus for Surface Inspection of Moving Material Including a Plurality of Detectors Arranged Along a Line Transverse to the Direction of Movement."

This invention relates to apparatus for surface inspection of a moving sheet or strip of material where the imperfections of the surface have a different appearance than the remainder of the surface and more particularly, to the surface defects found in rolled steel strip or sheet.

Inspectors judge the quality of strip rolled on a strip mill by the presence of defects and their size, distribution, type, location and rate of occurrence and then weigh all these factors collectively against the intended end use of the strip. Visual inspection cannot be used at the high speed of modern processing lines. In addition, many defects of interest are out of range of visual inspection, or may be only observed in hazardous areas, or may not be readily visible, such as the underside of a fast moving sheet where even mirrors are not very satisfactory. Present surface inspection devices provide the ability to detect and count defects without attention to size and identification, and although closed circuit television techniques are available to grade surface quality by assessing the severity and length of surface imperfections, there are no systems we are aware of which successfully detect and classify surface defects on a real time basis.

In accordance with our invention a plurality of photosensitive diodes detect defects periodically along a scanning line. The diode outputs are assembled for each scan line into counters sufficient to identify separate defects over the width of the strip. Upon the conclusion of a defect pattern, a digital computer develops a recognition vector which includes a least square fit of both pattern perimeters, a least square fit of the median vector, perimeter maximum and minimum points, center displacement from coil beginning and a coil edge, defect area and defect length. From this data the defect is identified by the method as explained in "A Numerical Method for On-Line Repetitive Defect Recognition and Off-Line Pattern Reproduction" by G. J. Readal, Masters Thesis, University of Pittsburgh, 1969. The defect may be printed out and checked for repetitive patterns.

It is therefore an object of our invention to provide apparatus for continuously monitoring the surface condition of a moving material.

Another object is to provide apparatus for detecting and recording defects on a real time basis.

A further object is to provide apparatus which produces a facsimile of surface defects on a moving strip.

These and other objects will be more apparent after referring to the following specification and drawings in which.

Figure 1:
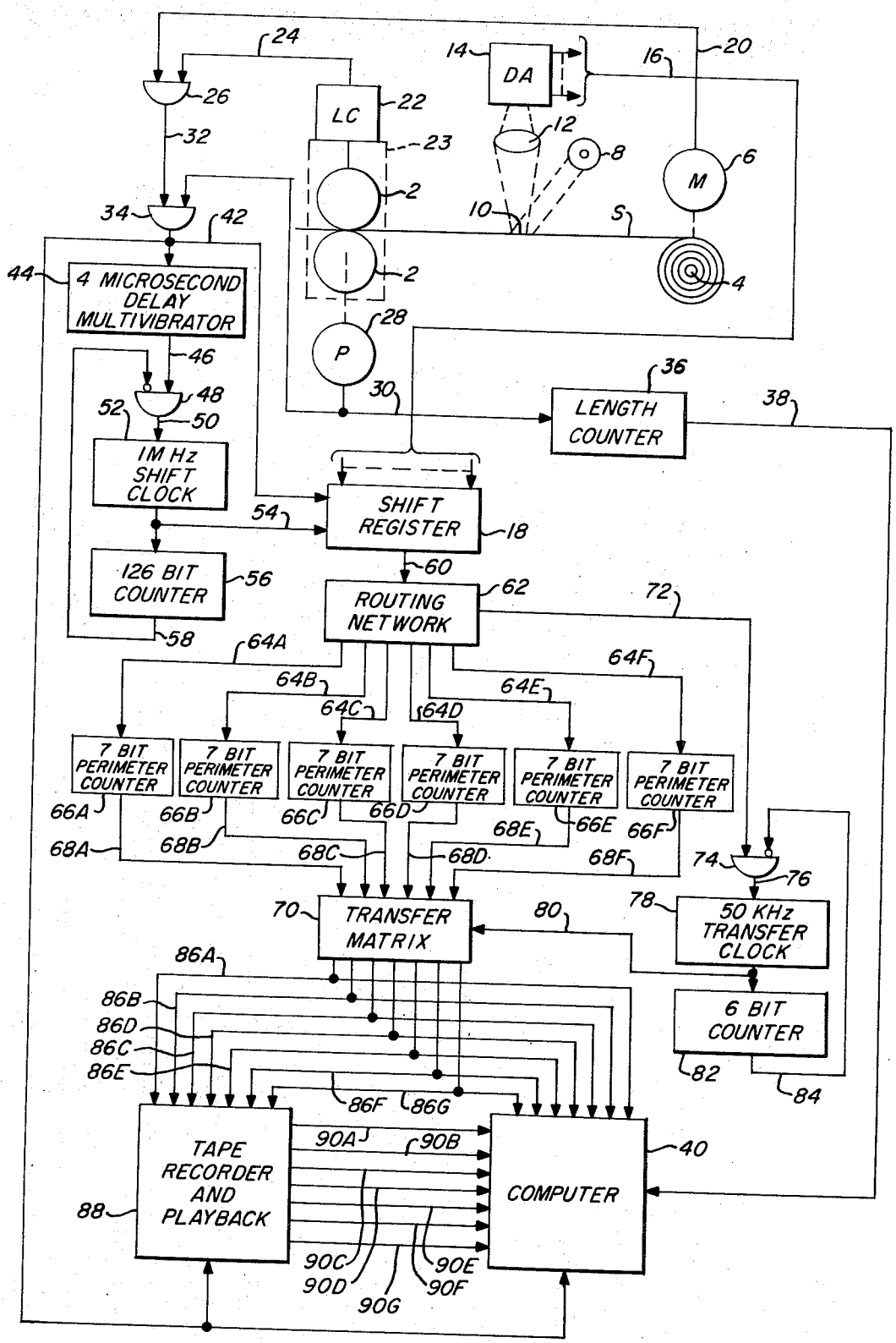
FIG. 1 is a schematic block diagram for inspecting one side of a strip according to the preferred embodiment of our invention.
Figure 2:
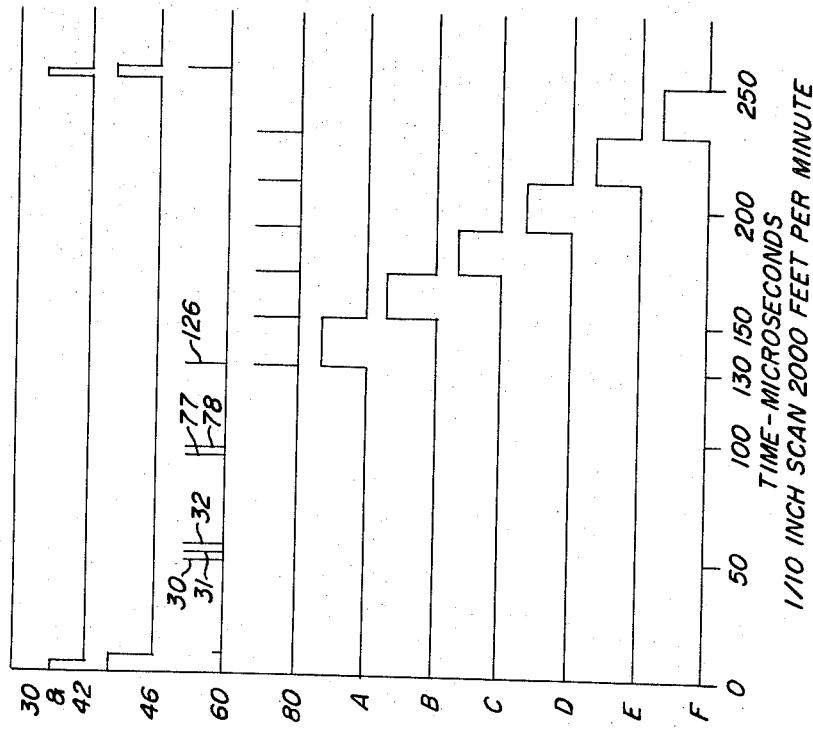
FIG. 2 is a timing chart of the circuitry of the preferred embodiment of our invention.

Referring now to FIGS. 1 and 2, reference numeral 2 indicates the rolls of a finishing stand of a conventional strip mill which is rolling strip S. The strip is coiled on a coiler 4 driven by a motor 6. A light source 8 is directed towards the strip focusing a thin line of light 10 across the strip. A lens 12 focuses the image of the line of light 10 upon a linear integrated photosensitive diode array 14, such as a Model FPA500 manufactured by Fairchild Semiconductor Corporation of Mountain View, California which has 126 separate diodes. Outputs 16 of diode array 14 are connected to inputs of a shift register 18. Motor 6 provides a signal 20 to indicate the motor is under load and strip S is taut. A load cell 22 in a housing 23 for rolls 2 provides a signal 24 which indicates, by the pressure on rolls 2, that strip S is being rolled. Signals 20 and 24 are connected to inputs of an AND gate 26. A pulse generator 28 is connected to rolls 2 to provide a pulse output 30 for each increment of travel of strip S, in the preferred embodiment each 1/10 inch of strip travel. An output 32 of gate 26 and output 30 are connected to inputs of an AND gate 34. Output 30 is also connected to a length counter 36 which has an output 38 connected to an input of a conventional general purpose digital computer 40. An output 42 of gate 34 is connected to an input gate of shift register 18 and an input of a 4 microsecond delay multivibrator 44. As shown in FIG. 2, pulses 42 are about ½ microsecond in duration and occur each 250 microseconds assuming a strip travel speed of 2000 feet per minute. An output 46 of multivibrator 44 is connected to an input of an AND gate 48. An output 50 of gate 48 is connected to an input of a one megacycle shift clock 52. Clock 52 has an output 54 connected to an input of shift register 18 and to an input of a 126-bit counter 56, the bit total of counter 56 equals the number of diodes in array 14. Counter 56 has an output 58 connected to an inhibit input of gate 48.

Shift register 18 has an output 60 connected to an input of a routing network 62. Network 62 has six outputs 64A through 64F connected to inputs of six 7-bit perimeter counters 66A through 66F. Counters 66A-F have binary outputs 68A through 68F connected to inputs of a transfer matrix 70. Network 62 also has an output 72 connected to an input of an AND gate 74. Gate 74 has an output 76 connected to an input of a 50 kilocycle transfer clock 78. Clock 78 has an output 80 connected to an input of matrix 70 and to an input of a 6-bit counter 82. Counter 82 has an output 84 connected to an inhibit input of gate 74. Matrix 70 has a 7 significant figure binary output 86A through 86G connected to an input to computer 40 and to an input of a tape recorder and playback 88 which has a 7 significant figure binary output 90A through 90G connected to an input of computer 40. Output 42 of gate 34 is connected to an input of tape recorder and playback 88 and to an input of computer 40.

Figure 3:
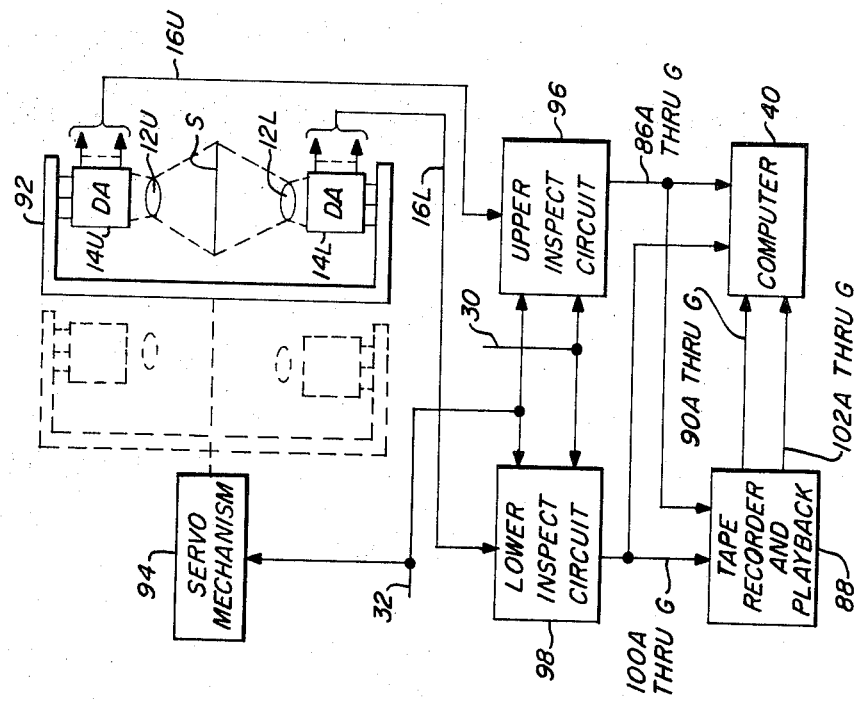
FIG. 3 is a schematic cross-sectional diagram for inspecting both sides of a strip.

FIG. 3 shows the inspection system adapted to inspect both sides of sheet S. A lens 12U focuses light on an upper diode array 14U and a lens 12L focuses light on a lower diode array 14L. Diode arrays 14U and 14L and lenses 12U and 12L, together with their respective light sources (not shown), are mounted on a C frame 92. C frame 92 is movable by a servo-mechanism 94 between its dotted line and solid line positions. Output 32 is connected to an input of servo-mechanism 94. Diode array 14U has outputs 16U connected to inputs of an upper inspect circuit 96 which includes the circuitry as shown in FIG. 1 from gate 34 and beyond and from shift register 18 and beyond through transfer matrix 70 providing outputs 86A through 86G to inputs of tape recorder and playback 88 and to inputs of computer 40. Outputs 16L of diode array 14L are connected to inputs of a lower inspect circuit 98, similar to circuit 96, and which provides outputs 100A through 100G connected to inputs of tape recorder and playback 88 and to inputs of computer 40. Outputs 102A through 102G of tape recorder and playback 88 are connected to inputs of computer 40.

In operation, referring to FIGS. 1 and 2, strip S is fed through rolls 2 and coiled into coil 4. The load on rolls 2 activates load cell 22 sending signal 24 to gate 26. When motor 6 tightens strip S, signal 20 is sent to gate 26, output 32 is established, and scanning may begin. Light source 8 provides the line of light 10, and the photosensitive diode array 14 will then detect a surface defect on the strip as it passes under the line of light. The focusing system represented by lens 12 provides the scanning width, in the preferred embodiment, the 126 diode array has one diode focused on each 1/10 inch increment across the width of the strip for a field of view of 12.6 inches. Greater widths may be handled in a similar manner. With pulse generator 28 supplying a pulse 30 for each 1/10 inch of travel of strip S, a scanning grid of 1/10 inch squares is provided. Assuming a strip speed of 2000 feet per minute, pulses 30, FIG. 2, occur every 250 microseconds as shown by the timing chart of FIG. 2. However, with a slower speed, one scan is made and the data processed in 250 microseconds.

When pulse generator 28 supplies a pulse, as shown in FIG. 2, preferably of short duration such as ½ microsecond, gate 34 passes the pulse output 42 to the input gate to shift register 18. Upon the occurrence of this pulse, all the diode outputs as they exist at that time are entered into the shift register in parallel. The shift register will then have a binary 0 corresponding to each diode that receives the maximum light, and a binary 1 corresponding to each diode that is illuminated below its threshold intensity, an indication of a defect. The binary 0 and binary 1 designations could obviously be reversed with appropriate circuitry changes. Output 30 is also connected to counter 36 which counts the pulses and provides a length signal 38 for each coil to computer 40. Signal 42 is also connected to delay multivibrator 44 which provides signal 46 four microseconds later. This enables gate 48 to send shift pulses 54 from clock 52 to shift register 18 and serially shift out the 126 0 or 1 diode signals from register 18 from output 60 to routing network 62. When counter 56 has counted the number of diodes in the array, in this case, 126, an inhibit signal 58 inhibits gate 48 and the shift to routing network 62 is complete.

When the diode outputs are shifted out of shift register 18, network 62 simultaneously connects the output to all the counters 66A-F. Six counters are provided for a capability of determining the perimeters of up to three defects occuring across the width of the strip on any one scan line. If it is desired to provide for more than three defects, two additional counters are needed for each additional defect to be detected. Routing network 62 allows all counters 66A through 66F to accumulate counts until a transition from a 0 pulse to a 1 pulse occurs in shift register output 60. Network 62 then stops counter 66A at that count, but continues counting in counters 66B through 66F until the next transition occurs, in this case from a 1 pulse output to a 0 pulse output, when counter 66B is stopped. Thus the perimeters of a defect are now determined as 1/10 inch increments, as for example, in FIG. 2, signal 60 shows that counter 66A would show a count of 30 and counter B would show a count of 32 for a defect of 3/10 of an inch wide. Routing network 62 then stops counters in succession for each transition, as for example, in FIG. 2, counter 66C would count to 77, counter 66D to 78, and counters 66E and 66F would each count to 126. For a full width defect, counter 66A would count 1 and all other counters would count to 126. For a scan with no defects, all counters would count to 126.

When all the stored states in shift register 18 have been cleared out, signal 72 enables gate 74, sending transfer pulses from clock 78 to transfer matrix 70. The outputs of counters 66A through 66F are in binary form and are transferred in sequence, counter 66A, 130 microseconds after the start of pulse 42, counter 66B, 20 microseconds later, continuing at 20 microsecond intervals until all counters are transferred serially to matrix 70. At the same time that matrix 70 is receiving the counts from each counter, matrix 70 provides 7-bit serial outputs 86A through 86G. The first output 86A from matrix 70 has the least significant figure of output 68A and continues to output 86G which has the most significant figure of output 68A. When clock 78 transfers the count in counter 66B, output 86A will have the least significant figure of output 68B and output 86G will have the most significant figure of output 68B and so on. These outputs are connected directly to computer 40 for determination of recognition vectors by the computer. If it is desired to record the raw data and later perform the computations, output 86 can be connected to a tape recorder and playback 88. Recorder 88 would include timing pulse 42 for separation of scans. The data may be released later through outputs 90A through 90G for subsequent use by computer 40.

While routing network 62 differentiates between the 0 and 1 outputs from shift register 18 and the counters 66A together with transfer matrix 70 locates the interface between 0 and 1 outputs, these functions may be combined by a connecting output 60 directly to computer 40 and programming computer 40 to perform the same functions. The storage function of shift register 18 could also be performed by a computer.

Computer 40 is programmed for detecting repetitive defect pattern and initiating an alarm for computing the recognition vectors to determine the defect shape and thereby classify the defect, to determine the defect area, and to determine the dimensions for locating the defect in terms of distance from edge and end of the strip, and, if desired, to reproduce a facsimile of the defect and a printed record of the inspection.

Pulse generator 28 is shown as connected to rotate with rolling mill rolls, but obviously may be connected elsewhere in the process line to provide a pulse for each increment of travel of the material. While it is shown as providing a pulse for a specific increment of rotation of the rolls 2, it could also be an analog tachometer with a voltage to frequency converter providing a sampling rate that is a function of line speed by varying the rate of sampling as the tachometer output amplitude varies. Where line speed is not important, the pulse generator 28 may be an oscillator that provides pulses on a time basis only, not on the material speed or displacement.

While our invention has been described and shown with a light source 8 providing a thin line of light 10 on the surface of the strip, any type of electromagnetic radiation could be used provided a sensor can detect the desired differences in the surface of the strip. In a hot strip, the strip itself may provide sufficient radiation for detection purposes without any additional radiation source. By using more than one sensitivity level for the sensors or by using sensors affected by different wave lengths, different levels or types of defects may be detected.

In FIG. 3, provision is made for inspecting both sides of a sheet simultaneously by duplicating the necessary circuitry. Computer 40 has the additional capability of handling both inspections simultaneously and correlating the results. The movable C frame is provided to minimize damages from cobbles during start-up, and, as long as gate 26 provides signal 32, frame 92 will be in operating position. As soon as signal 32 stops, servomechanism 94 will move frame 92 to the dotted line position, away from potential damage.

We claim:

1. Apparatus for inspecting the surface of a moving material comprising a plurality of spaced apart detectors located to have a field of view along a line transverse to the direction of travel of the material with each detector providing a first level output when no surface defect is detected and a second level output when a surface defect is detected, means for providing control pulses, means connected to said detectors for storing the outputs of said detectors, means connected to said means for providing control pulses and said means for storing outputs of said detectors and responsive to a control pulse for simultaneously entering detector outputs into said storage means, a plurality of counters for counting detector outputs, routing means responsive to a control pulse and connected to said means for storing outputs for controlling said counters whereby the detector outputs entered into said means for storing outputs are serially moved from said means for storing outputs simultaneously into each counter to begin counting and the counters sequentially stop counting upon the occurrence of each successive change in detector output level, and transfer means connected to said counting means and responsive to the completion of moving said outputs from said means for storing outputs for providing for each counter binary signals representative of the count in that counter.

2. Apparatus according to claim 1 in which the means for providing control pulses is a pulse generator providing a pulse for each movement of the material a predetermined distance and which includes means connected to said pulse generator for providing a signal representative of the length of material.

3. Apparatus according to claim 2 in which said detectors are photosensitive diodes and which includes means connected to said diodes for providing said first output when light reflected from the surface onto the diode is above the diode threshold intensity and said second output when below the diode threshold intensity.

4. Apparatus according to claim 3 which includes movable means for holding said plurality of detectors, and means responsive to production process conditions for moving said means for holding said detectors to a position for inspecting and for beginning inspection.

* * * * *